United States Patent [19]

Canning

[11] Patent Number: 5,500,267
[45] Date of Patent: Mar. 19, 1996

[54] SLIP-RESISTANT MAT FOR ABSORBING OIL AND OTHER LIQUIDS

[76] Inventor: George Canning, 8874 State Rte. 665, Grove City, Ohio 43123

[21] Appl. No.: 293,804

[22] Filed: Aug. 22, 1994

[51] Int. Cl.$^6$ .............................. B32B 3/02; F16N 31/02
[52] U.S. Cl. .............. 428/68; 15/215; 210/922; 210/924; 428/43; 428/72; 428/76; 428/121; 428/192; 428/194; 428/906
[58] Field of Search ................. 428/68, 72, 76, 428/906, 43, 121, 192, 194; 15/215; 210/922, 924

[56] References Cited

U.S. PATENT DOCUMENTS

| | | | |
|---|---|---|---|
| 3,308,009 | 3/1967 | Baumgartner | 161/211 |
| 3,435,481 | 4/1969 | Kessler | 15/215 |
| 3,517,407 | 6/1970 | Wyant | 15/215 |
| 3,578,738 | 5/1971 | Hughes | 15/215 |
| 4,130,685 | 12/1978 | Tarullo | 428/247 |
| 4,684,562 | 8/1987 | Hartkemeyer | 428/182 |
| 4,801,005 | 1/1989 | Hahn | 15/215 |
| 4,822,669 | 4/1989 | Roga | 428/287 |
| 4,876,135 | 10/1989 | McIntosh | 428/74 |
| 5,080,956 | 1/1992 | Smith | 428/166 |
| 5,236,753 | 8/1993 | Gaggero et al. | 428/43 |
| 5,270,089 | 12/1993 | Alston et al. | 428/60 |

*Primary Examiner*—Nasser Ahmad
*Attorney, Agent, or Firm*—John D. Gugliotta

[57] ABSTRACT

A multi-layered, slip-resistant, absorbent, and disposable mat is provided for absorbing oil and other liquids while retaining a slip-resistant surface upon which to walk after the oil and other liquids have been absorbed. A first layer of the mat is a fluid impermeable sheet with a slip-resistant surface, such as biodegradable plastic, foil, or rubber material, with the slip-resistant surface facing down toward a floor surface. A second layer is a glue material applied onto the face up surface of the fluid impermeable sheet. A third layer is an absorbent material applied to the glue material. The absorbent material may be cotton fiber, polymer material, polyethylene sponge, cellulose fiber, or other suitable material or a combination thereof, and preferably shaped into spherical or cylindrical beads. A fourth layer is a non-absorbent, fluid-permeable and slip-resistant material placed over the absorbent material. The fourth layer may be a screen or mesh, preferably comprised of nylon or nylon-covered metal. Finally, a combination of glue, heat, and pressure is applied to a surrounding perimeter defined by respective edges of the fluid-impermeable sheet and the fluid permeable and slip-resistant material, thereby to prevent misalignment of said layers, and to define an outside perimeter of the multi-layered, slip-resistant absorbent, and disposable mat. The mat may be manufactured as a length of mat and stored as a roll from which individual mini-mats may be separated therefrom at predetermined perforations.

3 Claims, 3 Drawing Sheets

5,500,267

SLIP-RESISTANT MAT FOR ABSORBING OIL AND OTHER LIQUIDS

BACKGROUND OF THE INVENTION

1. Field of the Invention

The present invention relates generally to a mat for absorbing oil and other liquids and, more particularly, to an absorbent mat that retains a slip-resistant walking surface.

2. Description of the Related Art

In the related art, several mats designed to catch spilled or drip fluids are known. In many instances, spilled or drip fluids occurring when one is working on a car or painting a room, or occurring in a baby's crib, or from a potted plant or a Christmas tree resting on a carpet, thereby may cause damage to the underlying floor surface.

Numerous attempts have been made to correct for the foregoing problems. A disposable carpet for winter use formed of a bottom sheet of paper coated on an upper surface of a water proof material, a second layer of plastic material, and a third layer or twisted or woven kraft paper is disclosed by U.S. Pat. No. 3,517,407, issued in the name of Wyant. Similarly, a floormat having a water absorbent top layer for wiping feet on an intermediate spongy layer that absorbs water, with both set in an imperforated tray, is disclosed by U.S. Pat. No. 3,578,738, issued in the name of Hughes. A wall covering including a sheet of cork sandwiched between and adhesively secured to a backing material on one side and a polymerized vinyl resin material on the facing side is disclosed by U.S. Pat. No. 4,130,685, issued in the name of Tarullo. A vinyl-cork tile including a clear resinous protective layer on the surface of the cork and a vapor barrier and cure control film of polypropylene embedded in the body of the tile close to its back surface is disclosed by U.S. Pat. No. 3,308,009, issued in the name of Baumgartner, Jr.

Of particular interest is U.S. Pat. No. 4,684,562, issued in the name of Hartkemeyer, which discloses a mat for absorbing oil and other liquids comprising: a first sheet for absorbing oil and other liquids, claimed to comprise cardboard material; a second, intermediate sheet for absorbing said oil; a liquid resistant bottom sheet; and means for securing all three sheets. This reference claims cardboard as a first layer. As one skilled in the art will recognize, although cardboard "will absorb drippings and conduct them isotropically to the intermediate layer" (Hartkemeyer, Col. 2, Lines 21–22), cardboard will also become very slick and dangerous to walk upon once the cardboard has received oil or drippings.

Hence, the above references in general, and the Hartkemeyer reference in particular, do not address the problem that occurs from a slick or otherwise slippery surface that results when the top layer from the above references has received spilled or dripped liquids. This slick surface may be dangerous in situations requiring one to walk on the slick surface of the mat. U.S. Pat. No. 5,270,089, issued in the name of Alston et al., discloses a fluid absorbing system wherein an integral grid of inverted, semi-conical projections or fingers with rounded upper ends is provided. This grid may be walked on while preventing oil or other liquids which are dripped, spilled or otherwise deposited thereon from coming into contact with the soles of a user's shoes. However, this reference is expensive to manufacture and is generally not portable or otherwise disposable.

Consequently, a need has been felt for providing an apparatus that overcomes the problem of absorbing spilled or dripped liquids while retaining a slip-resistant surface upon which to walk, and wherein the apparatus is portable, disposable, and inexpensive to manufacture.

SUMMARY OF THE INVENTION

It is therefore an object of the present invention to provide an improved multi-layered mat that absorbs oil and other liquids, such as motor vehicle drippings in a garage, in order to prevent damage and contamination to a floor surface.

Another object of the present invention is to provide a mat that absorbs oil and other liquids while retaining a slip-resistant surface upon which to walk.

Yet another object of the present invention is to provide an inexpensively manufactured and disposable mat for absorbing oil and other liquids while retaining a slip-resistant surface upon which to walk.

It is a feature of the present invention to provide an improved absorbent and disposable mat that includes a slip-resistant first layer that allows fluid to permeate to a second absorbent layer.

It is another feature of the present invention to be reversible by including a slip-resistant surface on the top exposed surface and on the surface of bottom layer which is to be exposed to a floor surface.

Briefly described according to one embodiment of the present invention, a multi-layered, slip-resistant, absorbent, and disposable mat is provided for absorbing oil and other liquids while retaining a slip-resistant surface upon which to walk after the oil and other liquids have been absorbed. A first layer of the mat is a fluid impermeable sheet with a slip-resistant surface, such as biodegradable plastic, foil, or rubber material, with the slip-resistant surface facing down toward a floor surface. A second layer is a glue material applied onto the face up surface of the fluid impermeable sheet. A third layer is an absorbent material applied to the glue material. The absorbent material may be cotton fiber, polymer material, polyethylene sponge, cellulose fiber, or other suitable material or a combination thereof, and preferably shaped into spherical or cylindrical beads. A fourth layer is a non-absorbent, fluid-permeable and slip-resistant material placed over the absorbent material. The fourth layer may be a screen or mesh, preferably comprised of nylon or nylon-covered metal. Finally, a combination of glue, heat, and pressure is applied to a surrounding perimeter defined by respective edges of the fluid-impermeable sheet and the fluid permeable and slip-resistant material, thereby to prevent misalignment of said layers, and to define an outside perimeter of the multi-layered, slip-resistant absorbent, and disposable mat.

Another preferred embodiment of the present invention is a mat for absorbing oil and other liquids, wherein the mat comprises: a first, bottom layer comprising a liquid resistant bottom sheet having a first surface, which is slip-resistant, and a second surface; a second, adhesive layer being applied to the second surface of the bottom layer; a third, absorbent layer comprising absorbent material for absorbing the oil and other liquids, the absorbent layer being disposed upon the adhesive layer; a fourth, slip-resistant layer being disposed upon the absorbent layer, for permeating the oil and other liquids therethrough for absorption by the absorbent layer, while retaining a slip-resistant surface upon which to walk after the oil and other liquids have permeated the slip-resistant layer and have been absorbed by the absorbent layer; and means for securing the bottom layer, the adhesive layer, the absorbent layer, and the slip-resistant layer, wherein the securing means prevents misalignment of the layers and surrounds the perimeter of the mat defined by respective edges of the bottom layer, the adhesive layer, the absorbent layer, and the slip-resistant layer.

An advantage of the present invention is that surface areas that are subject to spilled liquids may be protected.

Another advantage of the present invention is that dangerous slips and falls are minimized when walking upon the mat.

Another advantage of the present invention is that messes resulting from spillings are minimized, thereby saving time on clean-up.

Another advantage of the present invention is that it is disposable, thereby eliminating the need to launder rags and cloth tarps and dropcloths.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

1. Detailed Description of the Figures

Figure 1:
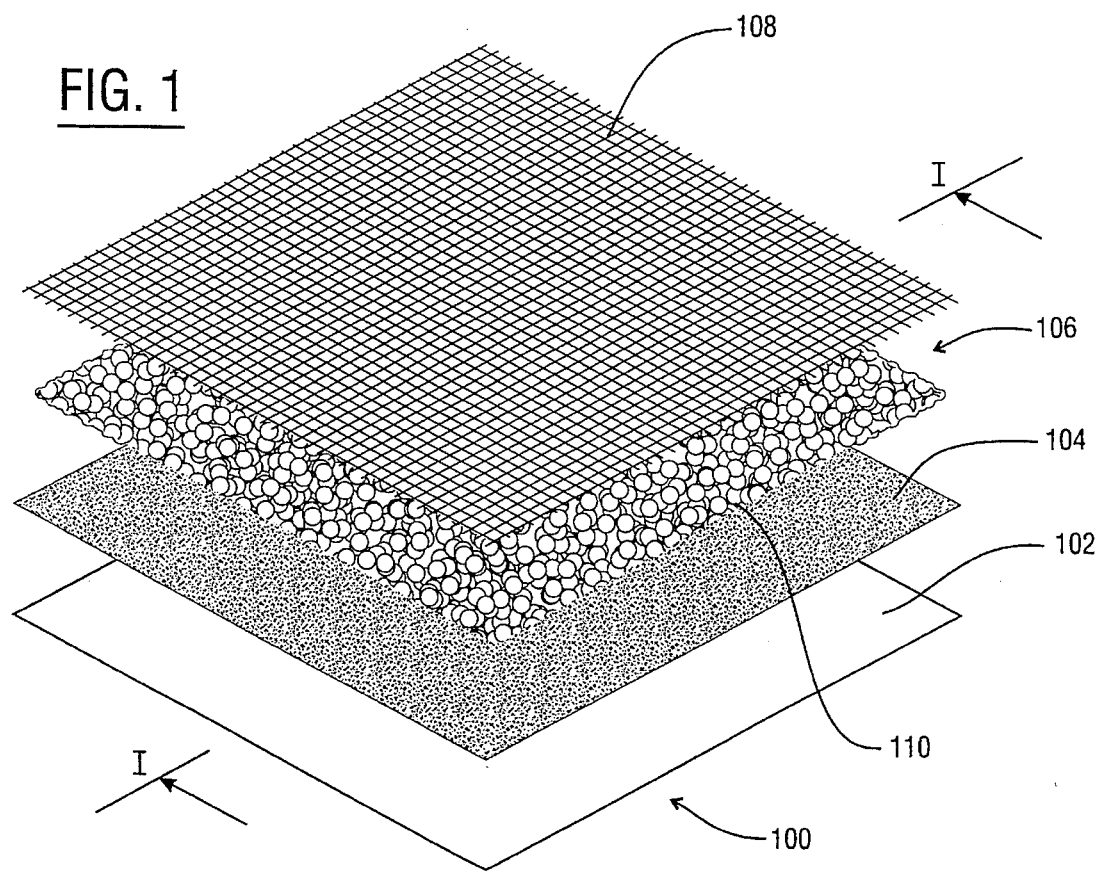
FIG. 1 is an exploded perspective view of a mat for absorbing oil and other liquids, shown in accordance with a preferred embodiment of the present invention.

Referring now to FIG. 1, a slip-resistant, disposable, absorbent mat 100 is shown, according to the present invention. The mat 100 is comprised of a first, bottom layer 102; a second, adhesive layer 104; a third, absorbent layer 106; and a fourth, slip-resistant layer 108.

The bottom layer 102 is a non-permeable sheet of material, such as biodegradable plastic, foil, or rubber material, for instance. The bottom layer 102 has at least one slip-resistant surface 302 (see FIG. 3) which is shown facing downward in FIG. 1. The bottom layer 102 is liquid resistant and serves to prevent the leakage of any liquid that may permeate through interstices or crevices in the absorbent layer 106.

The adhesive layer 104 is positioned above and adheres to the bottom layer 102. A preferred embodiment of the adhesive layer 104 is a glue material which is sprayed or otherwise applied onto the face up surface of the bottom layer 102.

The absorbent layer 106 is an absorbent material formed from cotton fiber, polymer material, polyethylene sponge, cellulose fiber, or other suitable material or a combination thereof. A preferred embodiment of the absorbent layer 106 is spherically-shaped absorbent beads 110, shown also as cylindrically-shaped beads, of the absorbent material. Each individual spherically-shaped bead 110 is individually placed upon or otherwise applied as a group to the adhesive layer 104, preferably immediately after the adhesive layer 104 is applied to the bottom layer 102, in order that the spherically-shaped absorbent beads 110 will bond to the adhesive layer 104, thereby forming the absorbent layer 106 positioned above and within the adhesive layer 104. Another preferred embodiment of the absorbent layer 106 is a layer of cellulose fiber applied and bonded to the adhesive layer 104.

The slip-resistant layer 108 is a nylon screen or other suitable mesh with interstices through which spilled oil and other fluids may permeate to the absorbent layer 106. The slip-resistant layer is positioned above the absorbent layer 106 and serves to protect the spherically-shaped absorbent beads 110 of the absorbent layer 106 against being dislodged from the adhesive layer 104. Another preferred embodiment of the present invention is a wire screen with individual droplets of rubber material (not shown) applied thereto.

Figure 2:
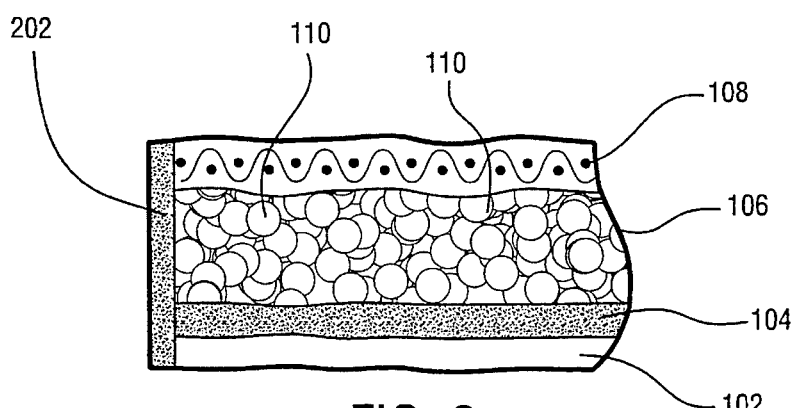
FIG. 2 is a cross-sectional view of the mat of FIG. 1, taken along the line I—I.

As shown in FIG. 2, layers 102, 104, 106, and 108 are aligned together and stacked, and subsequently are bonded in the position by an adhesive material 202, applied to the surrounding edges of the layers 102, 104, 106, and 108. Heat and pressure simultaneously applied with the adhesive material 202 to the surrounding edges of the layers 102, 104, 106 and 108 would thereby define an outside perimeter of the slip-resistant, disposable, absorbent mat 100. A preferred embodiment of the adhesive material 202 is glue.

2. Operation of the Preferred Embodiment

The mat 100 can be positioned on the floor of a garage beneath a motor vehicle so that oil, antifreeze, or brake fluid drippings will be caught within the slip-resistant layer 108, thereby to permeate through the interstices thereof to be absorbed by the plurality of spherically-shaped absorbent beads 110 of the absorbent layer 106. A preferred embodiment of the present invention may also be used under other leaking vehicles, such as trucks, lawnmowers, buses, boats, and motorcycles, to minimize the tracking of oil into areas where such is not desirable. Further, a preferred embodiment of the present invention may be used: as a lining in a baby's crib; as a protective carpet covering under a Christmas tree or otherwise potted plant; as a substitute car mat; and as a substitute shower mat.

Figure 3:
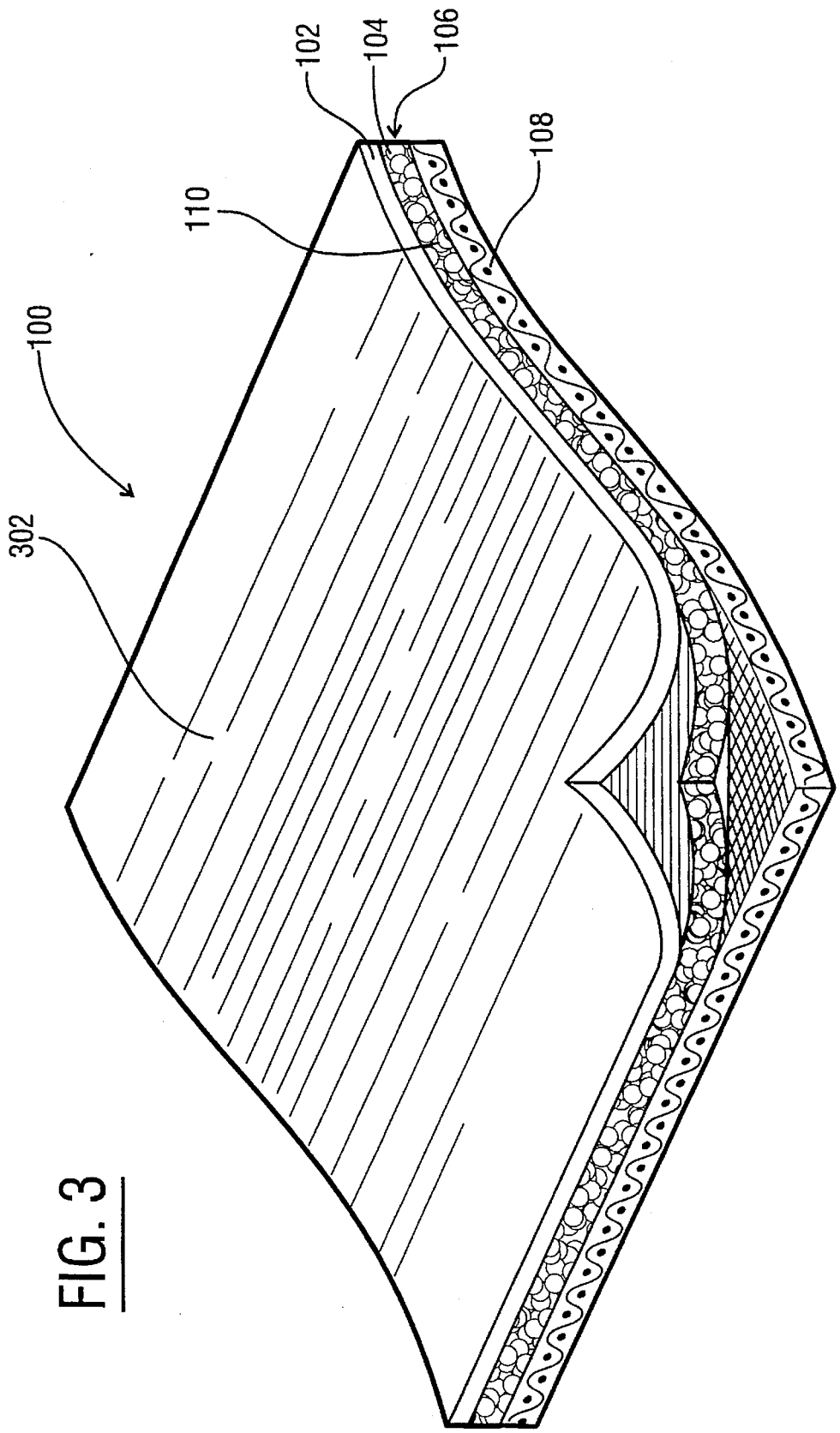
FIG. 3 is a perspective view of the assembled mat of FIG. 1, shown with the bottom layer of FIG. 1 facing up and the slip-resistant wire screen facing down, and shown with the layers separated on one corner.

Referring now to FIG. 3, a perspective view of the assembled mat of FIG. 1, shown with the bottom layer 102 of FIG. 1 facing up and the slip-resistant layer 108, in particular, wire screen, facing down. FIG. 3 illustrates the reversible feature of the mat 100. Specifically, the mat 100 may be utilized with the bottom layer 102 facing up and the slip-resistant layer 108 facing toward the floor surface. In this manner, the mat 100 may be placed over a pool of liquid that has already spilled. As such, the mat 100 may be used to absorb and contain an already spilled liquid. Further, when the mat 100 is used in this manner, the slip-resistant surface 302 serves to minimize slips and falls that may otherwise occur from walking through the spilled liquid instead of atop the now exposed slip-resistant surface 302 of the bottom layer 102.

For illustration purposes only, FIG. 3 shows one corner of the mat 100 with the bottom layer 102 separated from the adhesive layer 104, which is shown bonded to and in combination with the absorbent layer 106, thereby which is shown separated from the slip-resistant layer 108. A fully assembled mat 100 would have all corners and edges bonded with the adhesive material 202, thereby to define an outside perimeter of the slip-resistant, disposable, absorbent mat 100.

Figure 4:
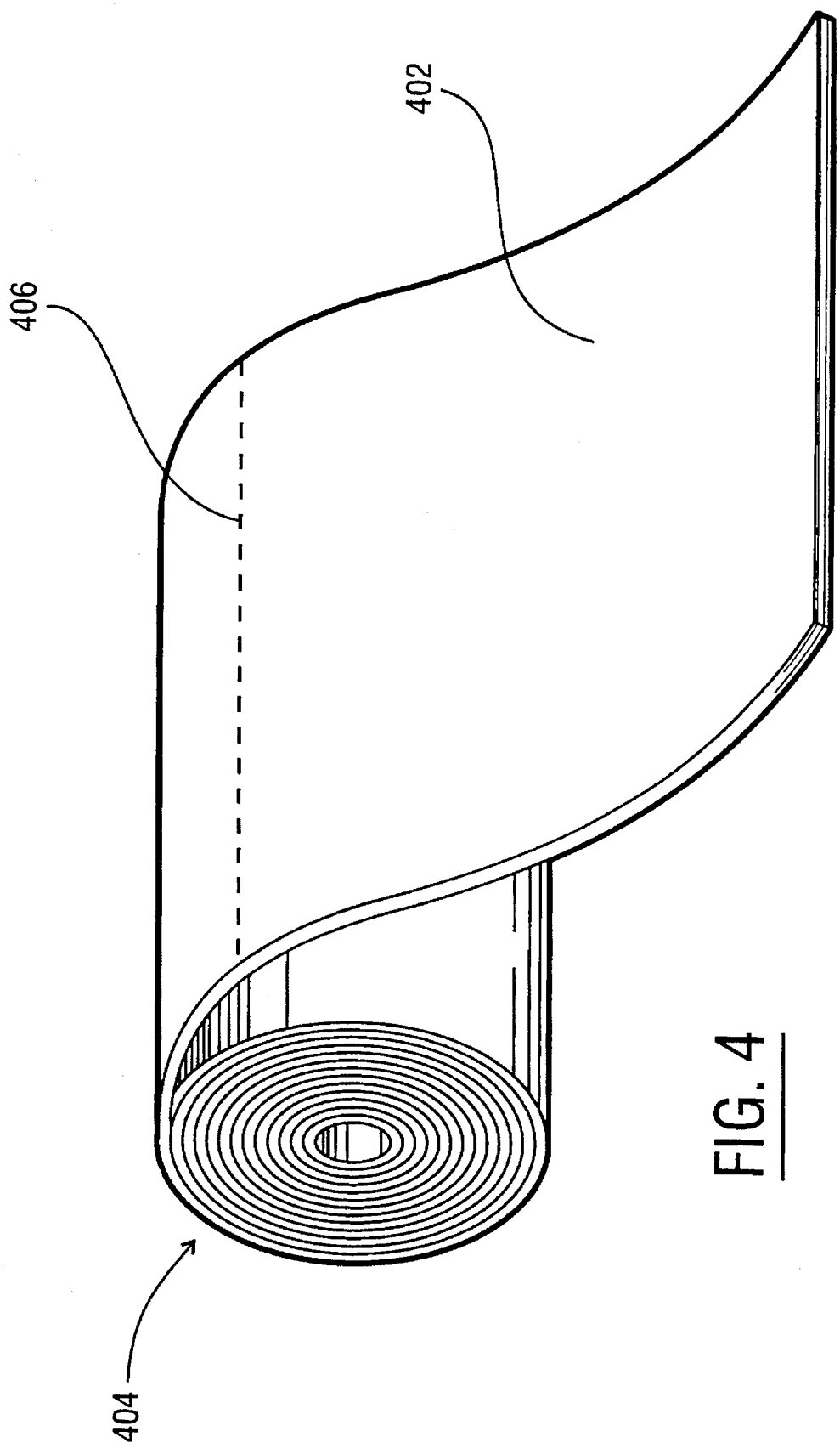
FIG. 4 is a length of the mat of FIG. 1 positioned into a roll with perforations at regular intervals to provide individual mats that may be separated from the roll.

In a preferred embodiment shown in FIG. 4, the mat 100 is manufactured as a length of mat 100 that is perforated at regular intervals, along which perforations "mini-mats" may be separated therefrom, particularly when the length of mat is stored as a roll. In this manner, an individual mini-mat 402 may be separated from a roll 404 of a length of mat 100 along a perforation 406, similar to separating a paper towel from a paper towel roll. One skilled in the art will recognize that each mini-mat 402 must be bonded with the adhesive material 202 along its entire perimeter. Therefore, adjacent mini-mats 402 on the roll 404 must be bonded with the adhesive material 202 on each immediate side of each perforation 406. Although many methods of accomplishing a roll of perforated, individual sheets are known in the art, it is currently envisioned that heat, pressure, and adhesive material 202, in addition to being applied to the surrounding edges of the layers 102, 104, 106, and 108, will also be applied perpendicularly and transversely across said layers in a narrow strip. This then forms a plurality of essentially rectangular mini-mats 402 in a continually adhered form. The series of linear perforations 406 are then introduced across the length of mat 100 at regular intervals corresponding with the location of the transversely applied strips of adhesive material 202. This is generally accomplished by "nibbling" across the length of mat 100 with a series of protruding "nibs", or by cutting, punching, or other conventional methods of introducing perforations into materials such as paper, plastic, foil, etc.

Thus, there has been shown and described an absorbent mat for absorbing spilled or dripped liquids while retaining a slip-resistant surface upon which to walk, and which fulfills all the objects and advantages sought therefore. Many changes, modifications, variations and other uses and applications of the subject invention will, however, become apparent to those skilled in the art after considering this specification and the accompanying drawings which disclose preferred embodiments thereof. All such changes, modifications, variations and other uses and applications which do not depart from the spirit and scope of the invention are deemed to be covered by the invention, which is limited only by the claims which follow.

What is claimed is:

1. A mat for absorbing liquids such as oil, antifreeze, brake fluid drippings, and Christmas tree drippings, wherein said mat comprises:

a first, bottom layer comprising a liquid resistant bottom sheet having a first surface, which is slip-resistant, and a second surface;

a second, adhesive layer being applied to said second surface of said bottom layer;

a third, absorbent layer comprising absorbent material for absorbing the oil and said other liquids, said absorbent layer being disposed upon said adhesive layer;

a fourth, non-absorbent slip-resistant layer being disposed upon said absorbent layer, for permeating said oil and said other liquids therethrough for absorption by said absorbent layer, while retaining a slip-resistant surface upon which to walk after the oil and said other liquids have permeated said slip-resistant layer and have been absorbed by said absorbent layer; and means for securing said bottom layer, said adhesive layer, said absorbent layer, and said slip-resistant layer, wherein said securing means prevents misalignment of said layers and surrounds the perimeter of said mat defined by respective edges of said bottom layer, said adhesive layer, said absorbent layer, and said slip-resistant layer, and wherein said securing means comprises heat and pressure applied in combination with an adhesive material to the surrounding edges of said layers, thereby bonding said adhesive material to said layers at said respective edges of said bottom layer, said adhesive layer, said absorbent layer, and said slip-resistant layer; and wherein said mat is manufactured as a length of mat having a series of linear perforations at regular intervals transversely across the width of said length of mat, thereby defining a plurality of individual mini-mats, along which of said perforations said individual mini-mat may be separated from said length of mat.

2. The mat according to claim 1, wherein the length of mat is stored as a roll.

3. The mat according to claim 2, wherein individual mats are bonded with said adhesive material on each immediate side of each of said perforations.

* * * * *